(12) United States Patent
Kumetani

(10) Patent No.: US 10,971,150 B2
(45) Date of Patent: Apr. 6, 2021

(54) SPEECH INPUT DEVICE AND REMOTE INTERACTION SYSTEM

(71) Applicant: SHARP KABUSHIKI KAISHA, Sakai (JP)

(72) Inventor: Kohji Kumetani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 86 days.

(21) Appl. No.: 16/387,453

(22) Filed: Apr. 17, 2019

(65) Prior Publication Data
US 2019/0333503 A1    Oct. 31, 2019

(30) Foreign Application Priority Data
Apr. 27, 2018    (JP) .............................. JP2018-087018

(51) Int. Cl.
*G10L 15/22*    (2006.01)
*G10L 15/30*    (2013.01)

(52) U.S. Cl.
CPC .............. *G10L 15/22* (2013.01); *G10L 15/30* (2013.01); *G10L 2015/223* (2013.01)

(58) Field of Classification Search
CPC ....................................................... G10L 15/22
See application file for complete search history.

(56) References Cited

U.S. PATENT DOCUMENTS

| | | | |
|---|---|---|---|
| 9,147,054 B1* | 9/2015 | Beal ........................ | G06F 21/31 |
| 2015/0373183 A1* | 12/2015 | Woolsey ............. | H04M 1/7255 |
| | | | 348/14.08 |
| 2017/0053650 A1 | 2/2017 | Ogawa | |
| 2019/0206395 A1* | 7/2019 | Aoki ....................... | G10L 15/30 |

FOREIGN PATENT DOCUMENTS

| | | |
|---|---|---|
| JP | 2016-024212 A | 2/2016 |
| WO | 2016/009646 A1 | 1/2016 |

\* cited by examiner

*Primary Examiner* — Jialong He
(74) *Attorney, Agent, or Firm* — ScienBiziP, P.C.

(57) ABSTRACT

A speech input device includes a speech input transducer that inputs first speech, a first communicator that transmits first speech data corresponding to the first speech to an external device, a second communicator that receives second speech data from a speech transmission-reception device, a speech output transducer that outputs second speech corresponding to the second speech data, and a controller that generates the first speech data from the first speech and generates the second speech from the second speech data. The controller determines whether or not the second speech data indicates an activation command, and in a case of determining that the second speech data indicates the activation command, the control module prohibits a transmission of the first speech data to the external device for a predetermined period.

5 Claims, 7 Drawing Sheets

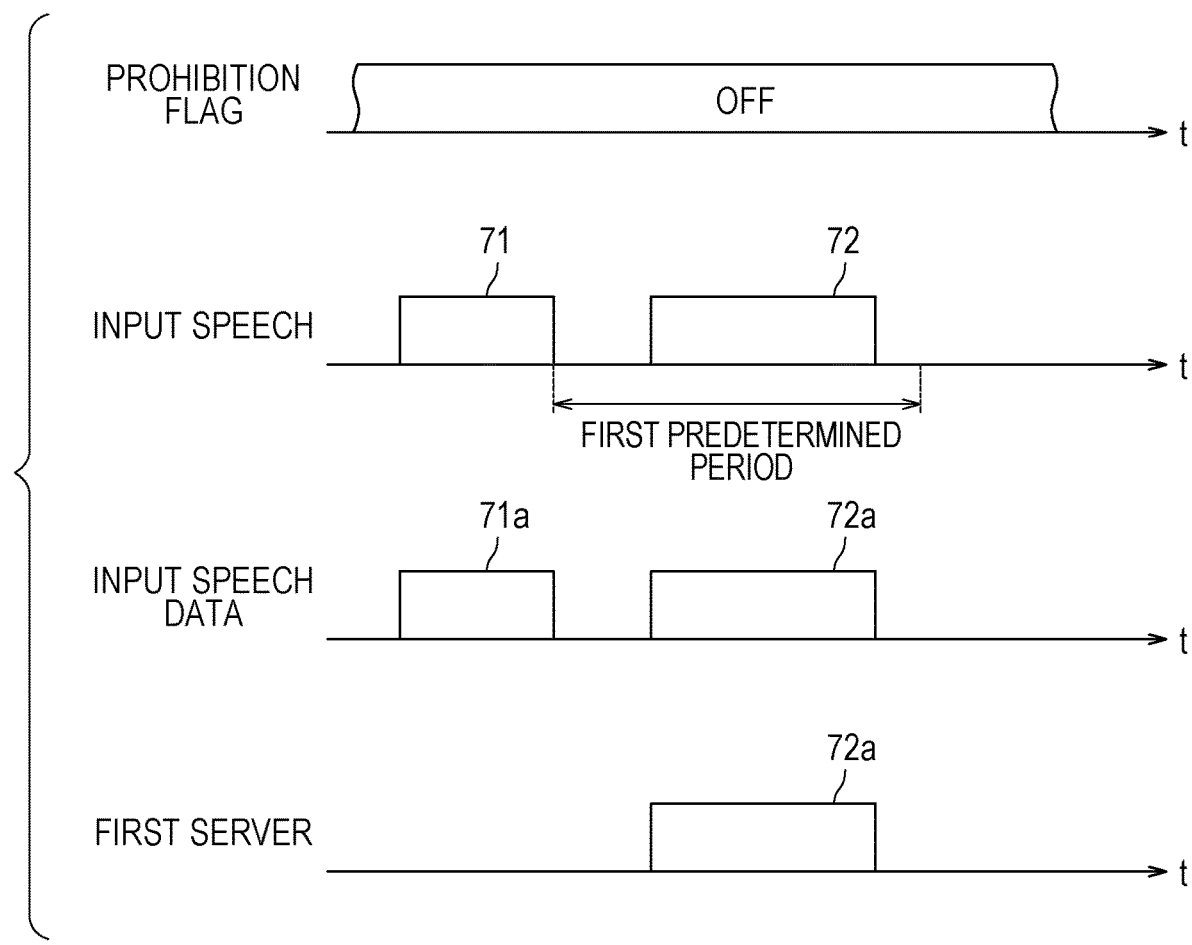

SPEECH INPUT DEVICE AND REMOTE INTERACTION SYSTEM

BACKGROUND

1. Field

The present disclosure relates to a speech input device and a remote interaction system.

2. Description of the Related Art

Speech input devices such as smart speakers are known. A specific activation command is set in a speech input device, and by speaking the activation command, a user is able to use the speech input device until a fixed period elapses (for example, see Japanese Unexamined Patent Application Publication No. 2016-024212). More specifically, after the user speaks the activation command, if the user speaks a process command expressing an instruction to execute a specific process, speech data indicating the result of executing the specific process is transmitted from a server to the speech input device.

However, during the execution of remote interaction such as web conferencing or video conferencing between a location A and a location B, for example, in the case in which a user speaks an activation command and a process command to a speech input device A installed at the location A, there is a risk that a process command unintended by a user at the location B will be transmitted from a speech input device B installed at the location B to a server. Specifically, in the case in which a user speaks an activation command and a process command to the speech input device A, speech indicating the activation command and speech indicating the process command is output at the location B by the remote interaction system such as a web conferencing system or a video conferencing system. As a result, there is a risk that the speech input device B will transmit the process command output by the remote interaction system to a server.

In light of the above issue, it is desirable to provide a speech input device and a remote interaction system capable of suppressing the transmission of a process command unintended by the user to a server.

SUMMARY

According to an aspect of the disclosure, there is provided a speech input device including a speech input transducer that inputs first speech, a first communicator that transmits first speech data corresponding to the first speech to an external device, a second communicator that receives second speech data from a speech transmission-reception device, a speech output transducer that outputs second speech corresponding to the second speech data, and a controller that generates the first speech data from the first speech and generates the second speech from the second speech data. The controller determines whether or not the second speech data indicates an activation command, and in a case of determining that the second speech data indicates the activation command, the control module prohibits a transmission of the first speech data to the external device for a predetermined period.

According to another aspect of the disclosure, there is provided a remote interaction system including a speech input device and a speech transmission-reception device. The speech input device is provided with a speech input transducer that inputs first speech, a first communicator that transmits first speech data corresponding to the first speech to an external device, a second communicator that receives second speech data from the speech transmission-reception device, a speech output transducer that outputs second speech corresponding to the second speech data, and a controller that generates the first speech data from the first speech and generates the second speech from the second speech data. The controller determines whether or not the second speech data indicates an activation command, and in a case of determining that the second speech data indicates the activation command, the control module prohibits a transmission of the first speech data to the external device for a predetermined period. The speech transmission-reception device includes a receiver that receives the second speech data from another speech transmission-reception device, and a transmitter that transmits the second speech data received from the other speech transmission-reception device to the second communicator.

BRIEF DESCRIPTION OF THE DRAWINGS

FIG. 7 is a diagram illustrating a process of transmitting speech data from the first smart speaker to the first server.

DESCRIPTION OF THE EMBODIMENTS

Figure 1:
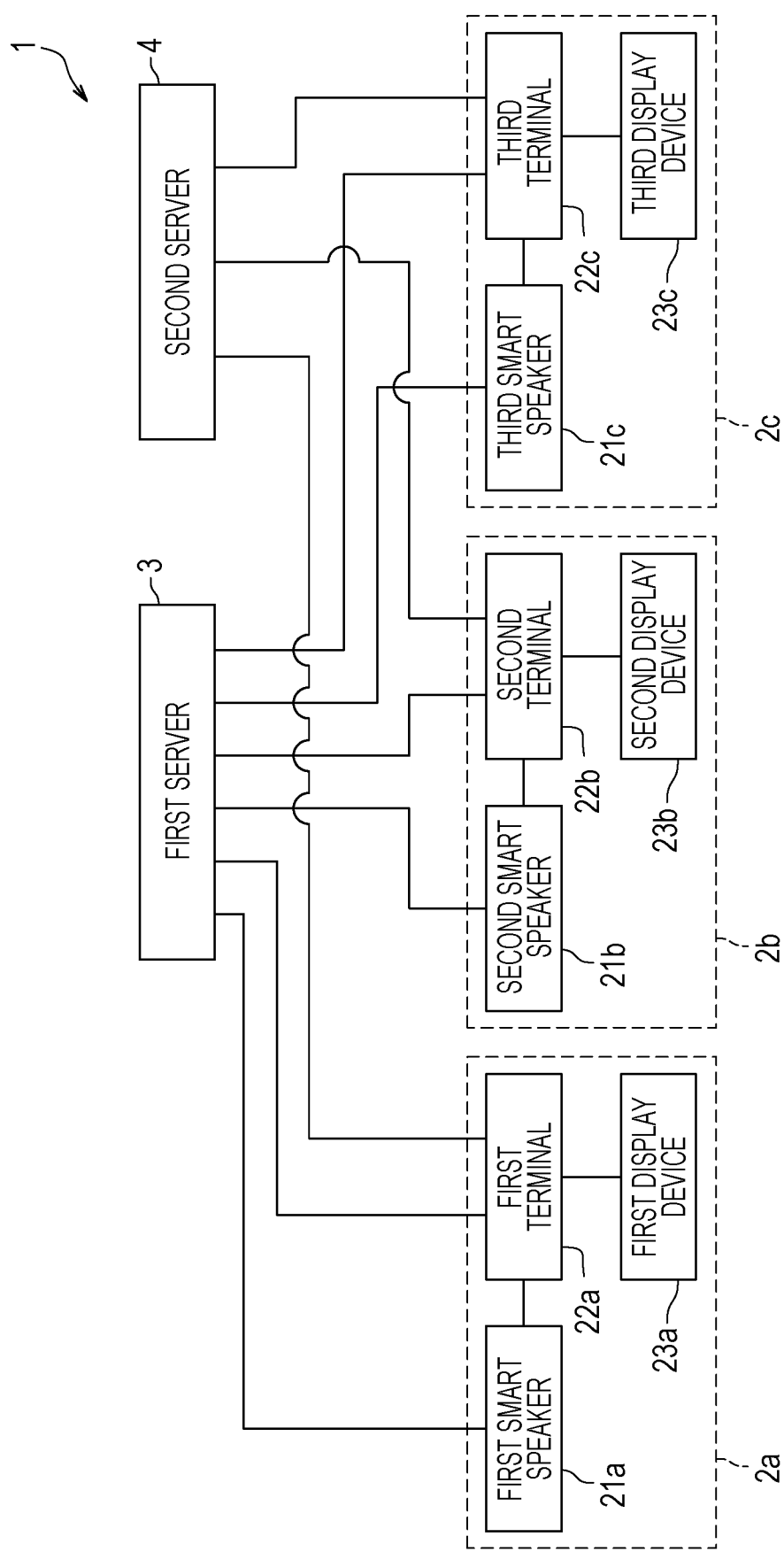
FIG. 1 is a diagram illustrating a configuration of a remote interaction system according to an embodiment of the present disclosure.

Hereinafter, an embodiment of the present disclosure will be described with reference to the drawings. However, the present disclosure is not limited to the following embodiment. Note that description will be omitted as appropriate for places with duplicate descriptions in some cases. Also, in the drawings, portions which are identical or equivalent will be denoted with the same reference signs, and description thereof will not be repeated.

First, FIG. 1 will be referenced to describe the configuration of a remote interaction system 1. FIG. 1 is a diagram illustrating a configuration of the remote interaction system 1 according to the present embodiment. As illustrated in FIG. 1, the remote interaction system 1 is provided with a first processing unit 2a to a third processing unit 2c, a first server 3, and a second server 4. The first server 3 is one example of an external device. In the present embodiment, the remote interaction system 1 is a web conferencing system.

The first processing unit 2a includes a first smart speaker 21a, a first terminal 22a, and a first display device 23a. The second processing unit 2b includes a second smart speaker 21b, a second terminal 22b, and a second display device 23b. The third processing unit 2c includes a third smart speaker 21c, a third terminal 22c, and a third display device 23c. Each of the first smart speaker 21a to the third smart speaker 21c is one example of a speech input device. Also, each of the first terminal 22a to the third terminal 22c is one example of a speech transmission-reception device.

In the present embodiment, each of the first terminal 22a to the third terminal 22c is an information processing device such as a notebook personal computer (PC) or a desktop PC, for example. Alternatively, each of the first terminal 22a to the third terminal 22c is a mobile information processing device such as a tablet PC or a smartphone, for example. The first smart speaker 21a and the first display device 23a are peripheral devices of the first terminal 22a, the second smart speaker 21b and the second display device 23b are peripheral devices of the second terminal 22b, and the third smart speaker 21c and the third display device 23c are peripheral devices of the third terminal 22c.

The first server 3 communicates with each of the first smart speaker 21a to the third smart speaker 21c over an Internet connection, for example. Specifically, the first server 3 receives speech data from the first smart speaker 21a to the third smart speaker 21c. Also, the first server 3 transmits speech data to the first smart speaker 21a to the third smart speaker 21c.

More specifically, when the first server 3 receives speech data from any one of the first smart speaker 21a to the third smart speaker 21c, the first server 3 determines whether or not a process command is recognizable from the received speech data. Specifically, the first server 3 converts the received speech data into text information by a speech recognition process, and determines whether or not a process command is recognizable from the text information. A process command is a command expressing an instruction to execute a specific process.

In the case in which a process command is successfully recognized from the speech data, the first server 3 acquires process result data indicating the result of executing the process corresponding to the process command. The process result data is speech data. The first server 3 transmits the process result data to the smart speaker that transmitted the speech data. For example, the process command indicates a search keyword and a keyword prompting the execution of a search process. In this case, the first server 3 executes a search process on the basis of the search keyword, and acquires data indicating the search result. Note that the first server 3 may also request another server to execute the process corresponding to the process command. In this case, the first server 3 acquires (receives) the process result data from the other server.

The second server 4 communicates with each of the first terminal 22a to the third terminal 22c over an Internet connection for example, and thereby causes web conferencing to be executed between the first terminal 22a to the third terminal 22c. Specifically, the second server 4 transmits speech data and image data received from the first terminal 22a to the second terminal 22b and the third terminal 22c. Similarly, the second server 4 transmits speech data and image data received from the second terminal 22b to the first terminal 22a and the third terminal 22c. Also, the second server 4 transmits speech data and image data received from the third terminal 22c to the first terminal 22a and the second terminal 22b.

Next, FIG. 1 will be referenced to describe the operations of the first processing unit 2a. Specifically, the operations of the first smart speaker 21a, the first terminal 22a, and the first display device 23a included in the first processing unit 2a will be described.

The first smart speaker 21a accepts the input of speech. The first smart speaker 21a converts input speech into speech data (digital data), and transmits the speech data to the first terminal 22a. Also, the first smart speaker 21a receives speech data from the first terminal 22a. The first smart speaker 21a outputs speech corresponding to the speech data received from the first terminal 22a. Furthermore, the first smart speaker 21a is provided with an imaging unit, and transmits image data to the first terminal 22a.

Additionally, the first smart speaker 21a stores data indicating an activation command. In the case in which speech indicating the activation command is input, the first smart speaker 21a enters a ready state until a first predetermined period elapses. If speech is input after the first smart speaker 21a enters the ready state and before the first predetermined period elapses, the first smart speaker 21a converts the input speech into speech data and transmits the speech data to the first server 3 and the first terminal 22a.

In the present embodiment, in the case in which speech data received from the first terminal 22a indicates the activation command, the first smart speaker 21a executes a prohibition process until a second predetermined period elapses. The prohibition process is a process that prohibits the transmission of speech data from the first smart speaker 21a to the first server 3.

The first terminal 22a transmits speech data and image data received from the first smart speaker 21a to the second server 4. Also, the first terminal 22a receives speech data and image data from the second server 4. The first terminal 22a transmits speech data received from the second server 4 to the first smart speaker 21a. The first terminal 22a outputs image data received from the second server 4 to the first display device 23a. The first display device 23a displays an image corresponding to the image data output from the first terminal 22a.

The above references FIG. 1 to describe the operations of the first processing unit 2a. Note that since the second processing unit 2b and the third processing unit 2c operate similarly to the first processing unit 2a, a description will be omitted.

Figure 2:
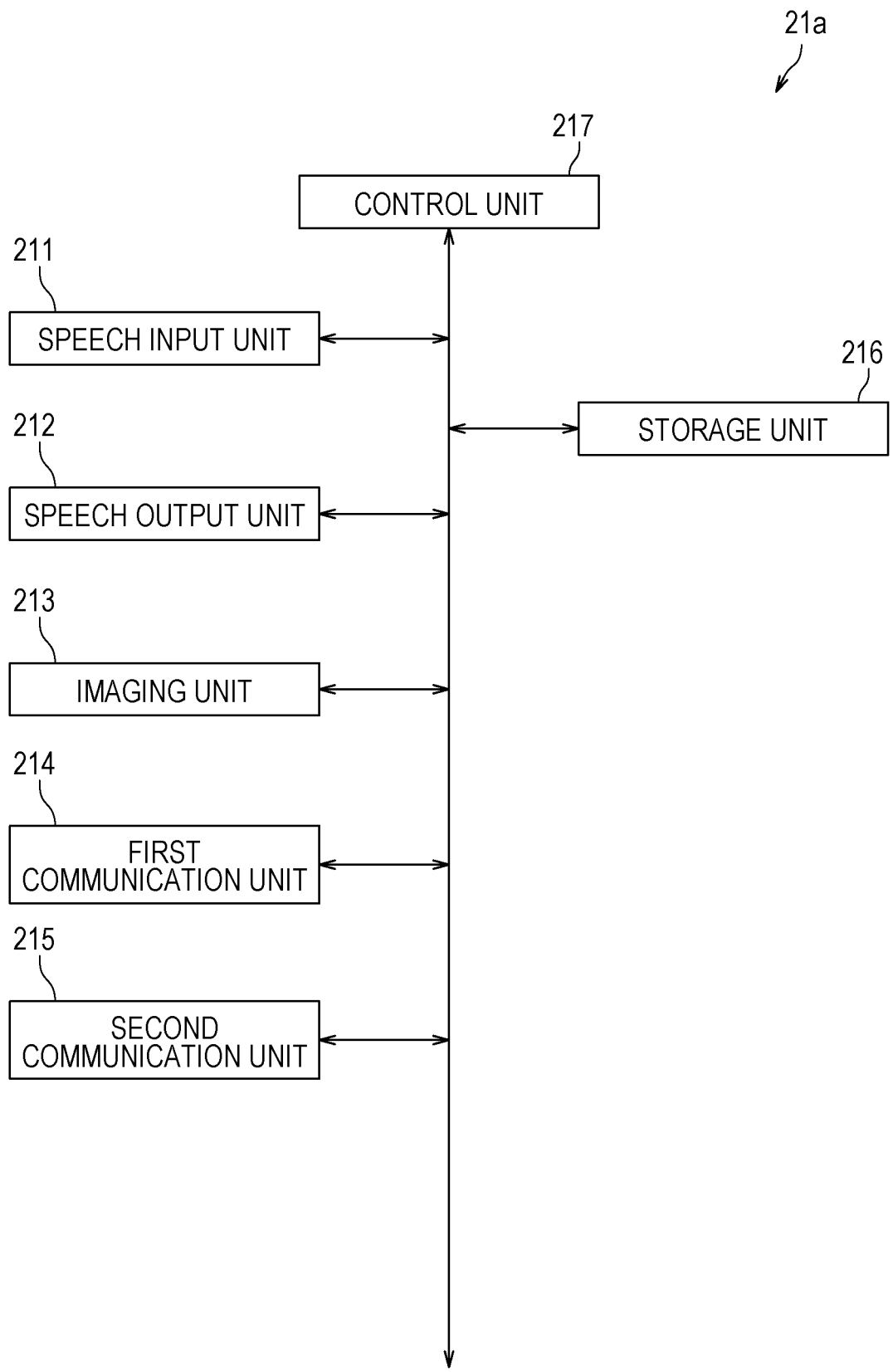
FIG. 2 is a diagram illustrating a configuration of a first smart speaker according to an embodiment of the present disclosure.

Next, FIGS. 1 and 2 will be referenced to describe the configuration of the first smart speaker 21a. FIG. 2 is a diagram illustrating the configuration of the first smart speaker 21a according to the present embodiment.

As illustrated in FIG. 2, the first smart speaker 21a is provided with a speech input unit 211, a speech output unit 212, an imaging unit 213, a first communication unit 214, a second communication unit 215, a storage unit 216, and a control unit 217.

The speech input unit 211 accepts the input of speech. Specifically, the speech input unit 211 picks up and converts speech into an analog electric signal. The analog electric signal is input into the control unit 217. The speech input unit 211 is a microphone, for example. Note that in the following description, the speech input by the speech input unit 211 will be designated the "input speech" in some cases.

The speech output unit 212 outputs speech corresponding to speech data received from the first terminal 22a. Also, the speech output unit 212 outputs speech corresponding to speech data received from the first server 3. The speech output unit 212 is a speaker, for example. Note that in the following description, the speech output by the speech output unit 212 will be designated the "output speech" in some cases.

The imaging unit 213 images the surrounding environment of the first smart speaker 21a and outputs an image signal (analog electric signal). For example, the imaging unit 213 is provided with an image sensor such as a charge-coupled device (CCD).

The first communication unit 214 controls communication with the first server 3. The first communication unit 214 is provided with a local area network (LAN) board or a wireless LAN board, for example. Specifically, the first communication unit 214 transmits speech data corresponding to the input speech to the first server 3. Also, the first communication unit 214 receives speech data from the first server 3. Note that in the following description, the speech data corresponding to input speech will be designated the "input speech data" in some cases.

The second communication unit 215 controls communication with the first terminal 22a. The second communication unit 215 is provided with a wireless communication module conforming to a short-range wireless communication standard such as Bluetooth (registered trademark), for example. Alternatively, the second communication unit 215 may be a Universal Serial Bus (USB) interface provided with a USB port.

The second communication unit 215 transmits input speech data to the first terminal 22a. Also, the second communication unit 215 transmits image data corresponding to the image signal output from the imaging unit 213 to the first terminal 22a. Furthermore, the second communication unit 215 receives speech data from the first terminal 22a. Note that in the following description, the speech data received by the second communication unit 215 will be designated the "received speech data" in some cases.

The storage unit 216 is provided with semiconductor memory such as random access memory (RAM) and read-only memory (ROM), for example. Additionally, the storage unit 216 may also be provided with a storage device such as a hard disk drive (HDD). The storage unit 216 stores a control program executed by the control unit 217. Additionally, the storage unit 216 stores data indicating the activation command described with reference to FIG. 1.

The control unit 217 is provided with a processor such as a central processing unit (CPU), a micro-processing unit (MPU), an application-specific integrated circuit (ASIC), or a digital signal processor (DSP), for example. The control unit 217 controls the operations of the first smart speaker 21a on the basis of the control program stored in the storage unit 216.

Specifically, the control unit 217 converts an analog electric signal (input speech) input from the speech input unit 211 into a digital signal (input speech data), and causes the second communication unit 215 to transmit the digital signal (input speech data). In other words, the control unit 217 generates speech data (input speech data) from speech (input speech) input by the speech input unit 211.

Also, the control unit 217 converts an image signal (analog electric signal) input from the imaging unit 213 into a digital signal (image data), and causes the second communication unit 215 to transmit the digital signal (image data).

Also, the control unit 217 converts a digital signal (received speech data) received by the second communication unit 215 into an analog electric signal, and causes the speech output unit 212 to output speech. In other words, the control unit 217 generates output speech from the speech data (received speech data) received by the second communication unit 215.

Also, when the control unit 217 enters the ready state, the control unit 217 also causes the first communication unit 214 to transmit input speech data in addition to the second communication unit 215. Furthermore, the control unit 217 converts a digital signal (speech data) received by the first communication unit 214 into an analog electric signal, and causes the speech output unit 212 to output speech. In other words, the control unit 217 generates output speech from the speech data received by the first communication unit 214.

In detail, when the control unit 217 generates input speech data, the control unit 217 references the data indicating the activation command stored in the storage unit 216, and determines whether or not the input speech data indicates the activation command. Specifically, the control unit 217 references the data indicating the activation command to determine whether or not speech data indicating the activation command is included in the input speech data. In the case in which the input speech data indicates the activation command, the control unit 217 enters the ready state until the first predetermined period elapses. Also, if input speech data is generated after entering the ready state and before the first predetermined period elapses, the control unit 217 transmits the input speech data to the first server 3 via the first communication unit 214 while also transmitting the input speech data to the first terminal 22a via the second communication unit 215. Note that the storage unit 216 stores data indicating the first predetermined period. The first predetermined period is 8 seconds, for example.

As described with reference to FIG. 1, when the first server 3 receives input speech data indicating a process command from the first smart speaker 21a, the first server 3 transmits process result data (speech data) to the first smart speaker 21a. As a result, the first communication unit 214 receives a digital signal (speech data) from the first server 3. The control unit 217 converts a digital signal (speech data) received by the first communication unit 214 into an analog electric signal, and causes the speech output unit 212 to output speech.

In the present embodiment, when the second communication unit 215 receives speech data, the control unit 217 analyzes the speech data (received speech data) received by the second communication unit 215. Subsequently, from the result of the analysis, the control unit 217 determines whether or not the received speech data indicates the activation command. In detail, the control unit 217 references the data indicating the activation command stored in the storage unit 216, and determines whether or not the received speech data indicates the activation command. Specifically, the control unit 217 references the data indicating the activation command to determine whether or not the received speech data includes speech data indicating the activation command.

When the control unit 217 determines that the received speech data indicates the activation command, the control unit 217 executes the prohibition process described with reference to FIG. 1. Specifically, until the second predetermined period elapses since determining that the received speech data indicates the activation command, the control unit 217 prohibits the transmission of speech data to the first server 3 by the first communication unit 214.

The length of the second predetermined period may be equal to or greater than the first predetermined period, and may also be equal to or less than the first predetermined period. However, in the case in which the second predetermined period is too long compared to the first predetermined period, there is a possibility that the first smart speaker 21a will not transmit a process command spoken intentionally by the user of the first processing unit 2a to the first server 3. On the other hand, in the case in which the second predetermined period is too short compared to the first predetermined period, there is a possibility that the first smart speaker 21a will transmit a process command unintended by the user of the first processing unit 2a to the first server 3. Consequently, the length of the second predetermined period preferably is substantially the same as the first predetermined period. The second predetermined period is 8 seconds, for example. Data indicating the second predetermined period is stored in the storage unit 216.

The above references FIGS. 1 and 2 to describe the configuration of the first smart speaker 21a. Note that since the configurations of the second smart speaker 21b and the third smart speaker 21c are similar to the configuration of the first smart speaker 21a, a description will be omitted.

Figure 3:
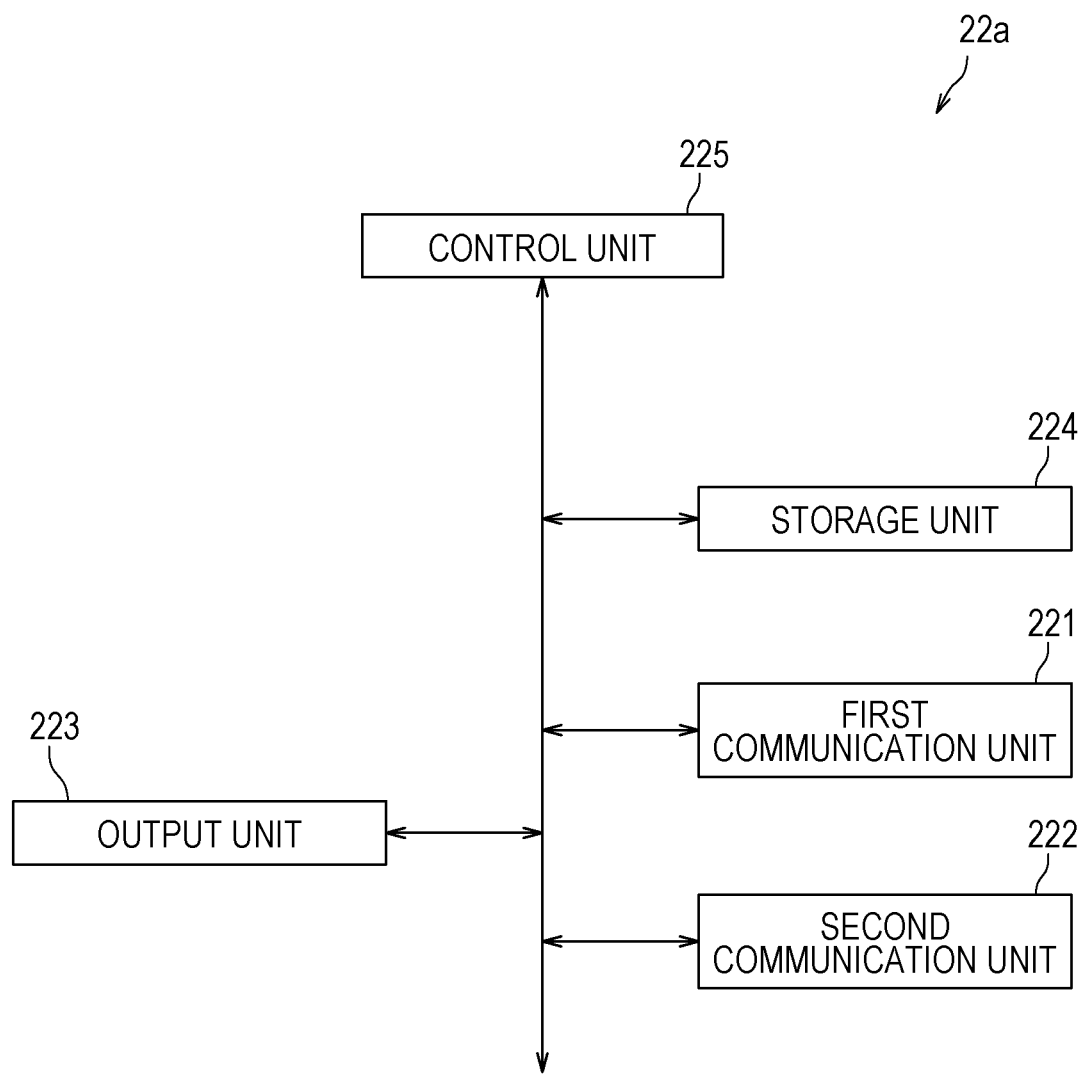
FIG. 3 is a diagram illustrating a configuration of a first terminal according to an embodiment of the present disclosure.

Next, FIGS. 1 and 3 will be referenced to describe the configuration of the first terminal 22a. FIG. 3 is a diagram illustrating the configuration of the first terminal 22a according to the present embodiment. As illustrated in FIG. 3, the first terminal 22a is provided with a first communication unit 221, a second communication unit 222, an output unit 223, a storage unit 224, and a control unit 225.

The first communication unit 221 controls communication with the second server 4. The first communication unit 221 is provided with a LAN board or a wireless LAN board, for example. The first communication unit 221 transmits speech data and image data to the second server 4. In other words, the first communication unit 221 transmits speech data and image data to the second terminal 22b and the third terminal 22c. Also, the first communication unit 221 receives speech data and image data from the second server 4. In other words, the first communication unit 221 receives speech data and image data from the second terminal 22b and the third terminal 22c. The first communication unit 221 is one example of a receiver.

The second communication unit 222 controls communication with the first smart speaker 21a. The second communication unit 222 is provided with a wireless communication module conforming to a short-range wireless communication standard such as Bluetooth (registered trademark), for example. Alternatively, the second communication unit 222 may be a USB interface provided with a USB port.

The second communication unit 222 receives speech data and image data from the first smart speaker 21a. Also, the second communication unit 222 transmits speech data to the first smart speaker 21a. The second communication unit 222 is one example of a transmitter.

The output unit 223 outputs image data to the first display device 23a. The output unit 223 is a digital video interface such as an HDMI (registered trademark) port or DisplayPort. Note that the output unit 223 may also be an analog video interface such as a D-sub port.

The storage unit 224 is provided with semiconductor memory such as RAM and ROM for example. Additionally, the storage unit 224 is provided with a storage device such as an HDD. The storage unit 224 stores a control program executed by the control unit 225. Also, the storage unit 224 stores web conferencing application software.

The control unit 225 is provided with a processor such as a CPU or MPU for example. Also, the control unit 225 controls the operations of the first terminal 22a on the basis of the control program stored in the storage unit 224.

Hereinafter, a process that the control unit 225 executes on the basis of the web conferencing application software will be described. By having the control unit 225 execute the web conferencing application software, the first terminal 22a of the first processing unit 2a executes web conferencing with the second terminal 22b of the second processing unit 2b and the third terminal 22c of the third processing unit 2c.

Specifically, the control unit 225 transmits speech data and image data received from the first smart speaker 21a via the second communication unit 222 to the second server 4 via the first communication unit 221. As a result, speech input into the first smart speaker 21a is output from the second smart speaker 21b of the second processing unit 2b and from the third smart speaker 21c of the third processing unit 2c. Also, an image captured by the first smart speaker 21a is displayed on the second display device 23b of the second processing unit 2b and the third display device 23c of the third processing unit 2c.

Also, the control unit 225 transmits speech data received from the second server 4 via the first communication unit 221 to the first smart speaker 21a via the second communication unit 222. As a result, the first smart speaker 21a outputs speech input into the second smart speaker 21b of the second processing unit 2b and speech input into the third smart speaker 21c of the third processing unit 2c.

Also, the control unit 225 outputs image data received from the second server 4 via the first communication unit 221 to the first display device 23a via the output unit 223. As a result, the first display device 23a displays an image captured by the second smart speaker 21b of the second processing unit 2b and an image captured by the third smart speaker 21c of the third processing unit 2c.

The above references FIGS. 1 and 3 to describe the configuration of the first terminal 22a. Note that since the configurations of the second terminal 22b and the third terminal 22c are similar to the configuration of the first terminal 22a, a description will be omitted.

Figure 4:
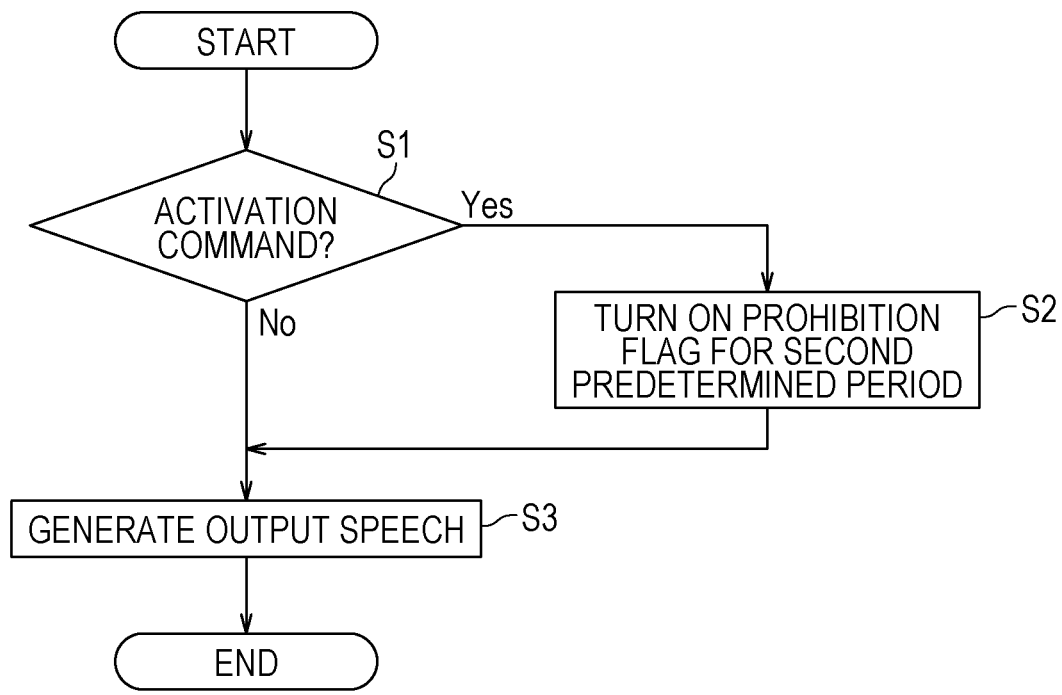
FIG. 4 is a flowchart illustrating a first operation of the first smart speaker according to an embodiment of the present disclosure.

Next, FIGS. 1, 2, and 4 will be referenced to describe a first operation of the first smart speaker 21a. FIG. 4 is a flowchart illustrating the first operation of the first smart speaker 21a according to the present embodiment. The operation illustrated in FIG. 4 starts when the second communication unit 215 of the first smart speaker 21a receives speech data from the first terminal 22a.

As illustrated in FIG. 4, when the second communication unit 215 receives speech data from the first terminal 22a, the control unit 217 determines whether or not the received speech data indicates the activation command (step S1). Specifically, the control unit 217 references the data indicating the activation command stored in the storage unit 216, and determines whether or not the received speech data indicates the activation command.

In the case of determining that the received speech data indicates the activation command (Yes in step S1), the control unit 217 turns on a prohibition flag until the second predetermined period elapses (step S2). The prohibition flag is stored in the storage unit 216. When the prohibition flag is turned on, the transmission of speech data to the first server 3 is prohibited. Note that in the case in which the prohibition flag is turned off, the transmission of speech data to the first server 3 is allowed.

After turning on the prohibition flag, the control unit 217 generates output speech from the received speech data (step S3). Alternatively, in the case of determining that the received speech data does not indicate the activation command (No in step S1), the control unit 217 generates output speech from the received speech data (step S3). Specifically, the control unit 217 converts the received speech data into an analog electric signal, and causes the speech output unit 212 to output speech corresponding to the received speech data. When the control unit 217 generates output speech, the first smart speaker 21a ends the operation illustrated in FIG. 4.

Figure 5:
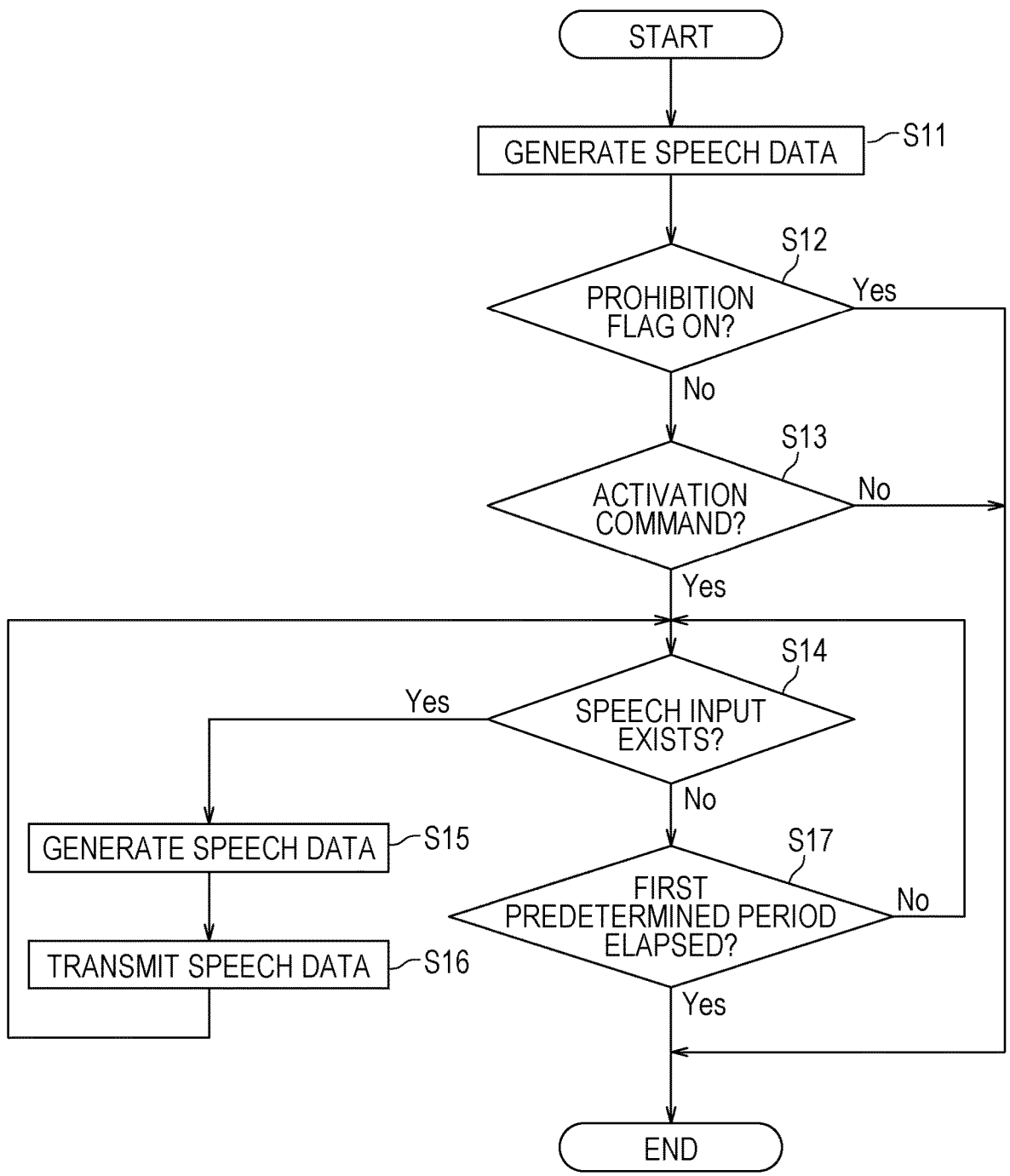
FIG. 5 is a flowchart illustrating a second operation of the first smart speaker according to an embodiment of the present disclosure.

Next, FIGS. 1, 2, and 5 will be referenced to describe a second operation of the first smart speaker 21a. FIG. 5 is a flowchart illustrating the second operation of the first smart speaker 21a according to the present embodiment. The operation illustrated in FIG. 5 starts when the speech input unit 211 of the first smart speaker 21a accepts the input of speech.

As illustrated in FIG. 5, when the speech input unit 211 accepts the input of speech, the control unit 217 generates input speech data (step S11). When input speech data is generated, the control unit 217 determines whether or not the prohibition flag stored in the storage unit 216 is turned on (step S12).

In the case of determining that the prohibition flag is turned on (Yes in step S12), the control unit 217 generates output speech from the input speech data. Specifically, the control unit 217 converts the input speech data into an analog electric signal, and causes the speech output unit 212 to output speech corresponding to the input speech data. When the control unit 217 generates output speech, the first smart speaker 21a ends the operation illustrated in FIG. 5.

In the case of determining that the prohibition flag is not turned on (No in step S12), or in other words, in the case in which the prohibition flag is turned off, the control unit 217 references the data indicating the activation command stored in the storage unit 216, and determines whether or not the input speech data indicates the activation command (step S13).

In the case of determining that the input speech data does not indicate the activation command (No in step S13), the control unit 217 generates output speech from the input speech data. When the control unit 217 generates output speech, the first smart speaker 21a ends the operation illustrated in FIG. 5.

In the case of determining that the input speech data indicates the activation command (Yes in step S13), the control unit 217 generates output speech from the input speech data. Furthermore, the control unit 217 enters the ready state until the first predetermined period elapses. In other words, the control unit 217 allows the transmission of speech data to the first server 3 until the first predetermined period elapses.

When the control unit 217 enters the ready state, the control unit 217 determines whether or not the speech input unit 211 has accepted the input of speech (step S14). In the case of determining that the speech input unit 211 has accepted the input of speech (Yes in step S14), the control unit 217 generates input speech data (step S15) and transmits the input speech data to the first server 3 via the first communication unit 214 while also transmitting the input speech data to the first terminal 22a via the second communication unit 215 (step S16). When input speech data is transmitted, the control unit 217 again determines whether or not the speech input unit 211 has accepted the input of speech (step S14).

In the case of determining that the speech input unit 211 has not accepted the input of speech (No in step S14), the control unit 217 determines whether or not the first predetermined period has elapsed since the control unit 217 entered the ready state (step S17).

In the case of determining that the first predetermined period has not elapsed (No in step S17), the control unit 217 again determines whether or not the speech input unit 211 has accepted the input of speech (step S14).

When the control unit 217 determines that the first predetermined period has elapsed (Yes in step S17), the first smart speaker 21a ends the operation illustrated in FIG. 5.

The above references FIGS. 1, 2, 4 and 5 to describe the operations of the first smart speaker 21a. Note that the second smart speaker 21b and the third smart speaker 21c execute the operations illustrated in FIGS. 4 and 5 similarly to the first smart speaker 21a.

Figure 6:
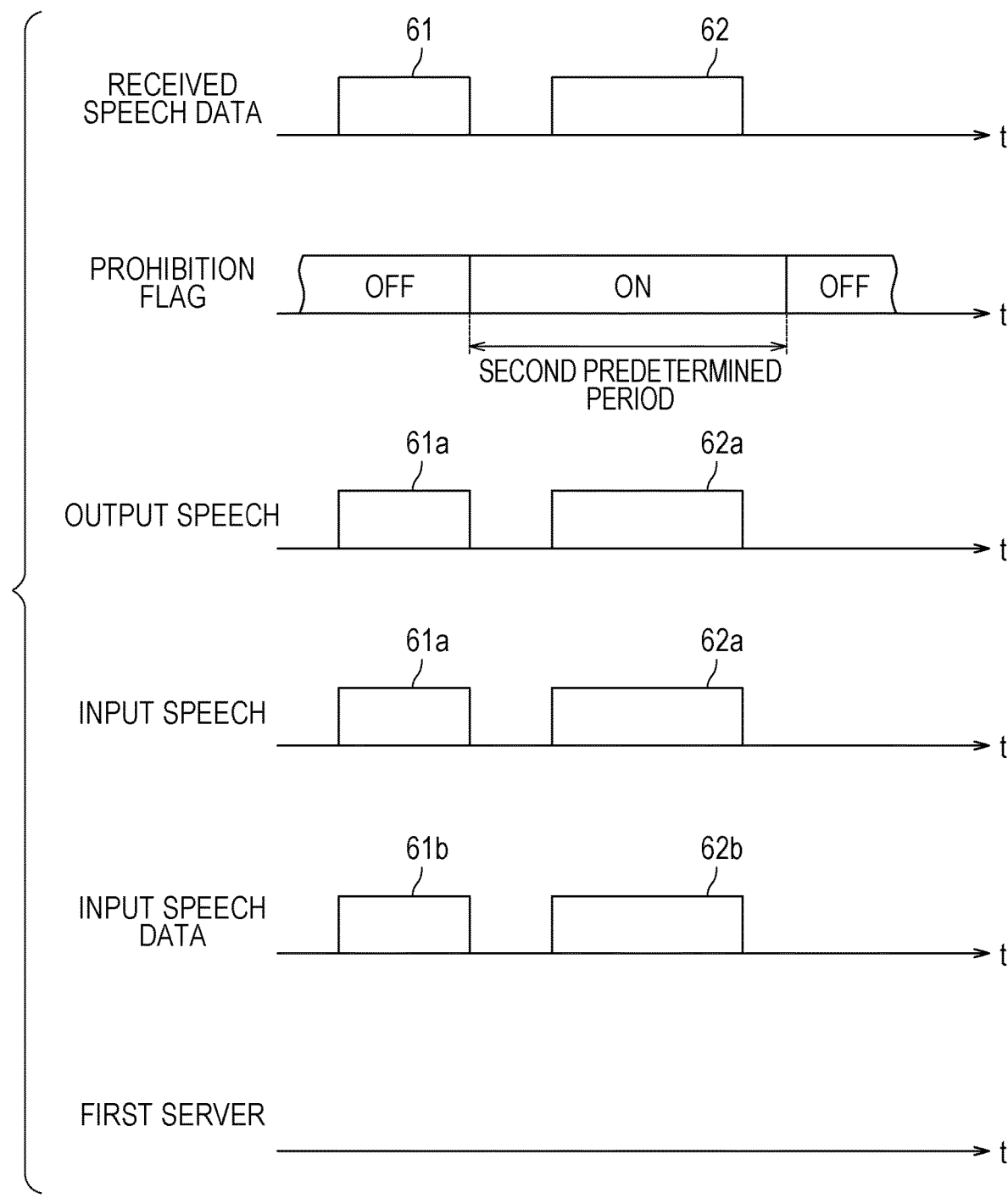
FIG. 6 is a diagram illustrating a process of prohibiting the transmission of speech data from the first smart speaker to a first server.

Next, FIGS. 1 to 3, 6, and 7 will be referenced to describe the prohibition process according to the present embodiment. FIG. 6 is a diagram illustrating the process that prohibits the transmission of speech data from the first smart speaker 21a to the first server 3. FIG. 7 is a diagram illustrating the process that transmits speech data from the first smart speaker 21a to the first server 3.

In detail, FIG. 6 illustrates the speech data (received speech data) that the first smart speaker 21a receives from the first terminal 22a, the prohibition flag stored by the first smart speaker 21a, the speech (output speech) output by the first smart speaker 21a, the speech (input speech) input by the first smart speaker 21a, the speech data (input speech data) generated by the first smart speaker 21a in correspondence with the input speech, and the speech data that the first smart speaker 21a transmits to the first server 3. FIG. 7 illustrates the prohibition flag stored by the first smart speaker 21a, the speech (input speech) input by the first smart speaker 21a, the speech data (input speech data) generated by the first smart speaker 21a in correspondence with the input speech, and the speech data that the first smart speaker 21a transmits to the first server 3. Note that in FIGS. 6 and 7, the horizontal axis is the time axis.

As illustrated in FIG. 6, when the first smart speaker 21a receives first speech data 61 indicating the activation command from the first terminal 22a, the prohibition flag is turned on until the second predetermined period elapses. Also, when the first smart speaker 21a receives the first speech data 61 from the first terminal 22a, first output speech 61a corresponding to the first speech data 61 is generated. The first output speech 61a is input into the first smart speaker 21a. As a result, first input speech data 61b corresponding to the first output speech 61a is generated. In other words, input speech data indicating the activation command is generated.

After the first speech data 61 is received, if the first smart speaker 21a receives second speech data 62 from the first terminal 22a before the second predetermined period elapses, second output speech 62a corresponding to the second speech data 62 is generated. The second output speech 62a is input into the first smart speaker 21a, and as a result, second input speech data 62b corresponding to the second output speech 62a is generated.

In the present embodiment, in the case in which the prohibition flag is on, speech data (the second input speech data 62b) is not transmitted to the first server 3 even if input speech data (the first input speech data 61b) indicating the activation command is generated.

On the other hand, as illustrated in FIG. 7, in the case in which the prohibition flag is off, if the first smart speaker 21a accepts the input of first speech 71 and generates input speech data 71a corresponding to the first speech 71, the first smart speaker 21a enters the ready state. Consequently, after the input of the first speech 71, if the first smart speaker 21a accepts the input of second speech 72 before the first predetermined period elapses, input speech data 72a corresponding to the second speech 72 is transmitted to the first server 3.

The above describes an embodiment of the present disclosure with reference to FIGS. 1 to 7. According to the present embodiment, it is possible to suppress the transmission of process commands unintended by the users of the first processing unit 2a to the third processing unit 2c from the first to third smart speakers 21a to 21c to the first server 3.

For example, even if a user speaks a process command after speaking the activation command to the first smart speaker 21a, and speech indicating the activation command and speech indicating the process command are output from the second smart speaker 21b and the third smart speaker 21c by the remote interaction system 1, the second smart speaker 21b and the third smart speaker 21c do not transmit speech data indicating the process command to the first server 3. Consequently, it is possible to suppress the transmission of process commands unintended by the users of the second processing unit 2b and the third processing unit 2c from the second smart speaker 21b and the third processing unit 2c to the first server 3.

Furthermore, according to the present embodiment, the transmission and reception of speech between the first processing unit 2a to the third processing unit 2c is not interrupted. Consequently, since speech output is not interrupted during web conferencing, it is possible to proceed with conferencing efficiently.

Note that the present disclosure is not limited to the above embodiment, and may be carried out in various modes in a scope that does not depart from the gist thereof.

For example, in the embodiment according to the present disclosure, a configuration in which the first smart speaker 21a to the third smart speaker 21c are provided with the imaging unit 213 is described, but the first terminal 22a to the third terminal 22c may also be provided with an imaging unit. Alternatively, a camera device may be connected as a peripheral device to the first terminal 22a to the third terminal 22c.

Also, in the embodiment according to the present disclosure, the remote interaction system 1 is a web conferencing system, but the remote interaction system 1 may also be a video conferencing system or a teleconferencing system. In this case, the first terminal 22a to the third terminal 22c are connected via a LAN.

In the case in which the remote interaction system 1 is a video conferencing system or a teleconferencing system, the second server 4 may be omitted. Also, in the case in which the remote interaction system 1 is a teleconferencing system, the first terminal 22a to the third terminal 22c may be a dedicated microphone/speaker device for teleconferencing. Also, in the case in which the remote interaction system 1 is a teleconferencing system, the first display device 23a to the third display device 23c may be omitted.

In addition, in the embodiment according to the present disclosure, a configuration in which the first processing unit 2a to the third processing unit 2c include the first terminal 22a to the third terminal 22c is described, but the first smart speaker 21a to the third smart speaker 21c may also include the functions of the first terminal 22a to the third terminal 22c. In this case, the first terminal 22a to the third terminal 22c may be omitted. In the case in which the first terminal 22a to the third terminal 22c are omitted, the first smart speaker 21a to the third smart speaker 21c receive speech data from the second server 4.

Also, in the embodiment according to the present disclosure, the remote interaction system 1 is provided with three processing units, but the remote interaction system 1 may also be provided with two processing units, or with four or more processing units.

The present disclosure is useful in a system that uses a speech input device such as a smart speaker.

The present disclosure contains subject matter related to that disclosed in Japanese Priority Patent Application JP 2018-087018 filed in the Japan Patent Office on Apr. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A speech input device comprising:
a speech input transducer that inputs first speech;
a first communicator that is provided with at least one of a local area network (LAN) board and a wireless LAN board, that controls data communication with an external device, and that transmits first speech data corresponding to the first speech to the external device, the first speech data being digital data;
a second communicator that is provided with at least one of a Universal Serial Bus (USB) interface and a wireless communication module conforming to a short-range wireless communication standard, that controls data communication with a speech transmission-reception device, and that receives second speech data from the speech transmission-reception device, the second speech data being digital data;
a speech output transducer that outputs second speech corresponding to the second speech data; and
a controller that includes a processor and that generates the first speech data from the first speech and generates the second speech from the second speech data, wherein
the controller determines whether or not the second speech data indicates an activation command, and
in a case of determining that the second speech data indicates the activation command, the controller prohibits a transmission of the first speech data to the external device for a predetermined period.

2. The speech input device according to claim 1, wherein
in a case of determining that the second speech data does not indicate the activation command, the controller determines whether or not the first speech data indicates the activation command, and
in a case of determining that the first speech data indicates the activation command, the controller allows the transmission of the first speech data to the external device for a predetermined period.

3. The speech input device according to claim 2, wherein
in a case in which the first speech data transmitted to the external device indicates a process command expressing an instruction to execute a specific process, the first communicator receives speech data indicating a result of executing the specific process, the speech data indicating the result of executing the specific process being digital data.

4. The speech input device according to claim 1, wherein
the second communicator transmits the first speech data to the speech transmission-reception device.

5. A remote interaction system comprising:
a speech input device; and
a speech transmission-reception device, wherein the speech input device includes
  a speech input transducer that inputs first speech,
  a first communicator that is provided with at least one of a local area network (LAN) board and a wireless LAN board, that controls data communication with an external device, and that transmits first speech data corresponding to the first speech to the external device, the first speech data being digital data,
  a second communicator that is provided with at least one of a Universal Serial Bus (USB) interface and a wireless communication module conforming to a short-range wireless communication standard, that controls data communication with the transmission-reception device, and that receives second speech data from the speech transmission-reception device, the second speech data being digital data,
  a speech output transducer that outputs second speech corresponding to the second speech data, and
  a controller that generates the first speech data from the first speech and generates the second speech from the second speech data,
the controller determines whether or not the second speech data indicates an activation command,
in a case of determining that the second speech data indicates the activation command, the controller prohibits a transmission of the first speech data to the external device for a predetermined period,
the speech transmission-reception device includes
  a receiver that receives the second speech data from another speech transmission-reception device, and
  a transmitter that transmits the second speech data received from the other speech transmission-reception device to the second communicator.

* * * * *